(12) United States Patent
Park et al.

(10) Patent No.: US 9,027,145 B2
(45) Date of Patent: May 5, 2015

(54) METHOD AND APPARATUS FOR DETECTING LEAK OF INFORMATION RESOURCE OF DEVICE

(71) Applicants: Samsung Electronics Co., Ltd., Suwon (KR); Seoul National University R&DB Foundation, Seoul (KR)

(72) Inventors: Ji-soon Park, Suwon (KR); Jin-yung Kim, Seoul (KR); Yong-ho Yoon, Seoul (KR); Jun-bum Shin, Suwon (KR); Kwang-keun Yi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/793,591

(22) Filed: Mar. 11, 2013

(65) Prior Publication Data
US 2013/0239223 A1 Sep. 12, 2013

(30) Foreign Application Priority Data
Mar. 12, 2012 (KR) ........................ 10-2012-0025227

(51) Int. Cl.
*G06F 21/60* (2013.01)
*G06F 21/55* (2013.01)

(52) U.S. Cl.
CPC .............. *G06F 21/60* (2013.01); *G06F 21/554* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,127,360 B1 | 2/2012 | Wilhelm et al. | |
| 2004/0148518 A1* | 7/2004 | Grundback et al. | 713/201 |
| 2004/0230964 A1* | 11/2004 | Waugh et al. | 717/168 |
| 2007/0240141 A1* | 10/2007 | Qin et al. | 717/158 |
| 2009/0013141 A1* | 1/2009 | Kinoshita | 711/163 |
| 2009/0100518 A1 | 4/2009 | Overcash | |
| 2009/0113547 A1* | 4/2009 | Higashikado | 726/23 |
| 2013/0067563 A1* | 3/2013 | Park et al. | 726/17 |

FOREIGN PATENT DOCUMENTS

| | | |
|---|---|---|
| EP | 1990724 A1 | 5/2007 |
| EP | 2073141 A1 | 7/2008 |
| KR | 10-2011-0084693 | 7/2011 |
| WO | WO 2010/023477 A1 | 3/2010 |

OTHER PUBLICATIONS

William Enck et al., "TaintDroid: An Information-Flow Tracking System for Realtime Privacy Monitoring on Smartphones", To appear at the 9$^{th}$ USENIX Symposium on Operating Systems Design and Implementation (OSDI '10), pp. 1-15.
International Search Report mailed on Jul. 8, 2013 in corresponding International Application No. PCT/KR2013/001968.

* cited by examiner

*Primary Examiner* — David Le
(74) *Attorney, Agent, or Firm* — Staas & Halsey LLP

(57) ABSTRACT

A method and apparatus for detecting a leak of an information resource of a device. Source code is obtained from an application and is analyzed to determine whether at least one information resource from among information resources of a device is transmittable to outside the device by tracking a task performed on the at least one information resource, thereby detecting whether the application is externally leaking an information resource from the device.

17 Claims, 7 Drawing Sheets

FIG. 6

| OPcode (hex) | Opcode name | Intermediate language instruction |
|---|---|---|
| 0 | nop | skip |
| 1 | move vx,vy | move |
| 2 | move/from16 vx,vy | |
| 3 | move/16 | |
| 4 | move-wide | |
| 5 | move-wide/from16 vx,vy | |
| 6 | move-wide/16 | |
| 7 | move-object vx,vy | |
| 8 | move-object/from16 vx,vy | |
| 9 | move-object/16 | |
| 0A | move-result vx | |
| 0B | move-result-wide vx | |
| 0C | move-result-object vx | |
| 0D | move-exception vx | |
| 0E | return-void | return |
| 0F | return vx | combination of move and return |
| 10 | return-wide vx | |
| 11 | return-object vx | |
| 12 | const/4 vx,lit4 | move |
| 13 | const/16 vx,lit16 | |
| 14 | const vx, lit32 | |
| 15 | const/high16 v0, lit16 | |
| 16 | const-wide/16 vx, lit16 | |
| 17 | const-wide/32 vx, lit32 | |
| 18 | const-wide vx, lit64 | |
| 19 | const-wide/high16 vx,lit16 | |
| 1A | const-string vx,string_id | |
| 1B | const-string-jumbo | |
| 1C | const-class vx,type_id | |
| 28 | goto target | call-direct |
| 29 | goto/16 target | |
| 2A | goto/32 target | |
| 32 | if-eq vx,vy,target | jmpnz |
| 33 | if-ne vx,vy,target | |
| 34 | if-lt vx,vy,target | |
| 35 | if-ge vx, vy,target | |
| 36 | if-gt vx,vy,target | |
| 37 | if-le vx,vy,target | |
| 38 | if-eqz vx,target | |
| 39 | if-nez vx,target | |
| 3A | if-ltz vx,target | |
| 3B | if-gez vx,target | |
| 3C | if-gtz vx,target | |
| 3D | if-lez vx,target | |

METHOD AND APPARATUS FOR DETECTING LEAK OF INFORMATION RESOURCE OF DEVICE

CROSS-REFERENCE TO RELATED APPLICATIONS

This application claims the priority benefit of Korean Patent Application No. 10-2012-0025227, filed on Mar. 12, 2012, in the Korean Intellectual Property Office, the disclosure of which is incorporated herein in its entirety by reference.

BACKGROUND

1. Field

The present disclosure relates to a method and apparatus for analyzing an application executed in a smart device, and more particularly, to a method and apparatus for detecting whether an information resource obtained by an application is leaked outside a device by the application via static analysis.

2. Description of the Related Art

The use of smart devices, such as smart phones, tablets, smart televisions (TVs), and e-book readers (for example, kindle fire) has become widespread. In this regard, types and numbers of applications usable in the smart devices have been remarkably increased. Such applications use resources stored in the smart devices so as to provide convenient and useful services to users.

An application executed in a smart device is capable of externally transmitting a sensitive information resource, such as an address list or photos, based on authority requested by additional information included in the application and a program source of the application. However, if an information resource stored in the smart device is leaked against the will of a user or secretly from the user without permission excluding a case when the information resource is externally transmitted by the user, security concerns may arise.

FIG. 1 is a diagram for describing a method of detecting a leak of sensitive data by performing dynamic analysis on an application downloaded from a smart device platform. Referring to FIG. 1, the method is performed by installing software trackers at a portion transmitting and receiving a message between application codes, at a system library, and at a storage medium. Each tracker notifies whether an information resource used by an application is sensitive data, and generates an alarm if data externally transmitted through a network includes the sensitive data.

Since the method of detecting a leak of information sources by using the dynamic analysis is performed while executing an application, the method deteriorates performance of the smart device or the application. Unlike a virus that changes a function of an application by infecting a platform, the method needs to check a function realized in the application, and thus it is difficult to apply antivirus technology to the method.

Furthermore, since the method involves different scenarios of using resources of the smart device according to applications, it is difficult to analyze various and numerous applications due to a limit with respect to a batch test. An analysis range based on the method differs according to test cases, and it is practically difficult to analyze a total number of cases, and analytical reliability depends on the test cases.

SUMMARY

Additional aspects and/or advantages will be set forth in part in the description which follows and, in part, will be apparent from the description, or may be learned by practice of the disclosure.

The present disclosure provides a method and apparatus for detecting whether an information resource stored in a device may be leaked by an application by using static analysis, without having to execute the application.

According to an aspect of the present disclosure, there is provided a method of detecting a leak of an information resource of a device, the method including: obtaining source code from an application; determining that at least one information resource from among information resources of the device is a detection target information resource; tracking a task performed with respect to the detection target information resource based on the source code; and determining whether the determined at least one information resource is transmittable to outside of the device, based on the tracking.

The determining may include determining that at least one information resource from among information resources determined to be accessible by the application is the detection target information resource, based on the source code.

The method may further include obtaining additional information including access authority information about information resources accessible by the application from the application, wherein the determining may include determining that at least one information resource from among the information resources accessible by the application is the detection target information resource, based on the additional information.

The detection target information resource may be determined based on a predetermined criterion. One or more information resources may be addable to or excludable from the detection target information resource based on an input of a user.

According to another aspect of the present disclosure, there is provided an apparatus to detect a leak of an information resource of a device, the apparatus including: an application obtainer for obtaining source code from an application; an application analyzer for determining that at least one information resource from among information resources of the device is a detection target information resource, and tracking a task performed with respect to the detection target information resource based on the source code; and an information leak determiner for determining whether the determined at least one information resource is transmittable to outside the device, based on the tracking.

According to another aspect of the present disclosure, there is provided a method of detecting a leak of an information resource of a device, the method including: obtaining source code from an application; determining that at least one information resource from among information resources of the device is a detection target information resource; converting the source code to an intermediate language code by using an intermediate language; tracking a task performed with respect to the detection target information resource based on the intermediate language code; and determining whether the determined at least one information resource is transmittable to outside of the device, based on the tracking.

The converting may include grouping one or more instructions included in the source code according to a predetermined criterion, and converting the grouped one or more instructions by matching the grouped one or more instructions with one intermediate language instruction.

The converting may include converting one instruction included in the source code to a combination of one or more intermediate languages instructions according to a predetermined criterion.

According to another aspect of the present disclosure, there is provided a computer-readable recording medium having recorded thereon a program for executing the method above.

BRIEF DESCRIPTION OF THE DRAWINGS

The above and other features and advantages of the present disclosure will become more apparent by describing in detail exemplary embodiments thereof with reference to the attached drawings in which:

FIG. 6 is a diagram for describing an example of machine language-intermediate language conversion according to an embodiment of the present disclosure;

DETAILED DESCRIPTION

Hereinafter, the present disclosure will be described more fully with reference to the accompanying drawings, in which exemplary embodiments of the disclosure are shown.

Figure 1:
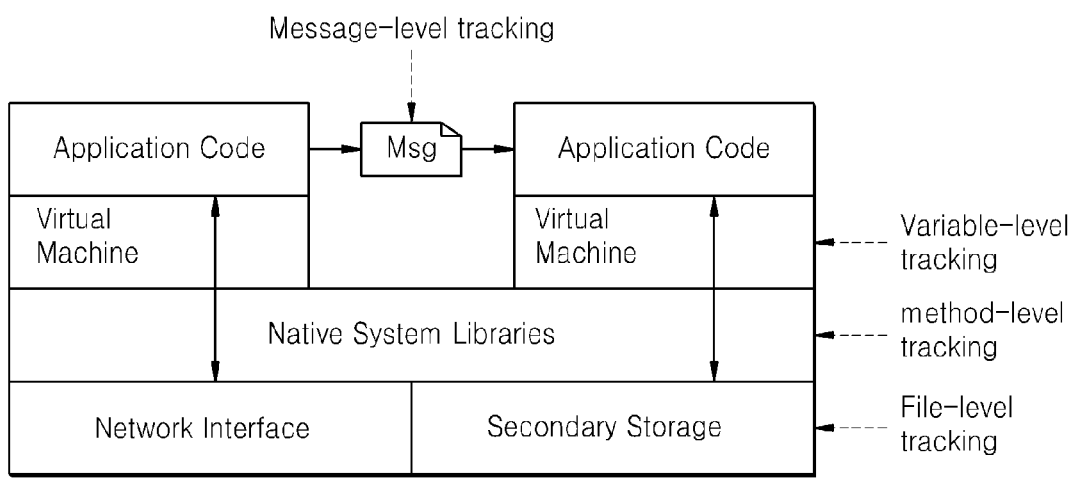
FIG. 1 is a diagram for describing a method of detecting a leak of sensitive data by performing dynamic analysis on an application downloaded from a smart device platform.
Figure 2:
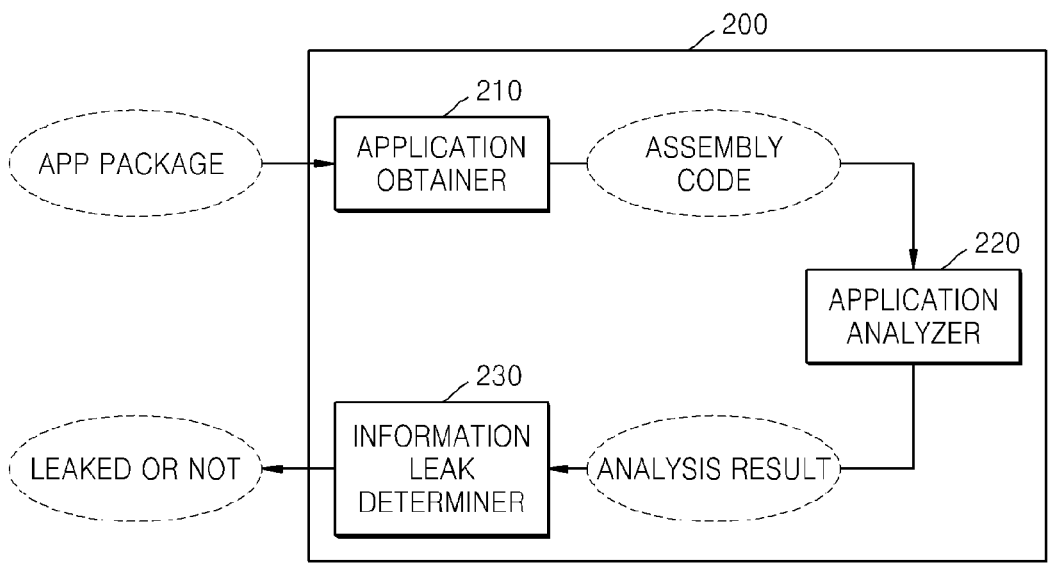
FIG. 2 is a diagram of an apparatus to detect a leak of an information resource, according to an embodiment of the present disclosure.

FIG. 2 is a diagram of an apparatus 200 to detect a leak of an information resource, according to an embodiment of the present disclosure. Referring to FIG. 2, the apparatus 200 includes an application obtainer 210, an application analyzer 220, and an information leak determiner 230. Herein, examples of the information resource include sensitive data such as personal information including account information, phone numbers, names, and birthdays, and user experiences including address books, photos, memos, and internet access records, and information and data stored in other devices and accessible by an application. The application obtainer 210 may be a source code obtainer, a source code extractor, data extractor, or the like.

An application or application package includes a program source file required to execute an application, and signature information, certification information, and permission (authority) request information related to the application. For example, as a non-limiting example, in an Android platform, an application includes a program source file resources.arcs, and additional information including an AndroidManifest.xml file and other folders. (File names are subject to change). A source file is recorded with a source code including a plurality of functions or instructions, and a manifest file includes authority request information about a resource and function accessible by an application.

The apparatus 200 may bring an application installed in a smart device from a storage space of the smart device, or receive an application from an external server connected via a wired and/or wireless network. Here, the apparatus 200 may further include an application receiver (not shown).

The application obtainer 210 may convert an obtained source code of an application to an assembly code suitable for a platform where the application is executed, or extract a source code converted to a suitable assembly code from an application package. For example, as a non-limiting example, in an Android platform, the application obtainer 210 may extract a source code in a byte code form of a Dalvik virtual machine where the application is executed.

Also, the application obtainer 210 may obtain additional information from an application. The additional information may include permission information about a resource and function to be accessed by the application.

The application analyzer 220 analyzes a source code of an application. The application analyzer 220 may determine an information resource accessible by an application by using a source code. For example, if a source code includes a function or instruction calling an address book, the application analyzer 220 may determine that the application may access an address book resource. The application analyzer 220 may determine that one or more information resources from among determined information resources is a detection target information resource of a leak.

Also, the application analyzer 220 determines how an information resource stored in a device is leaked to another portion of a program by analyzing a source code. The application analyzer 220 may track a movement path of an information resource determined to be accessible by an application from among information resources stored in a device, by analyzing a control flow of a source code. This will be described in detail with reference to FIG. 3.

Figure 3:
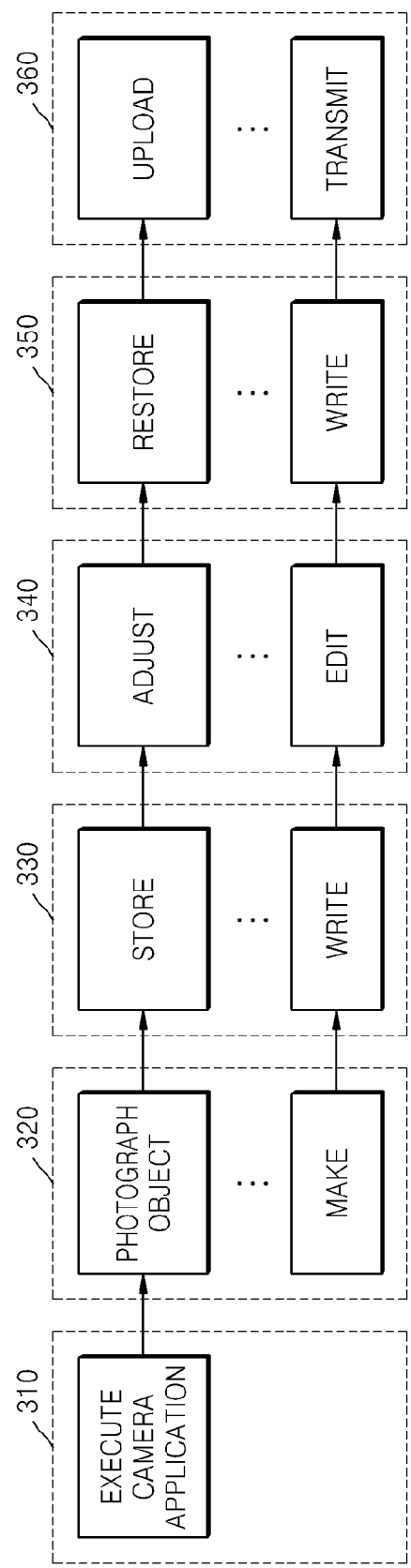
FIG. 3 is a diagram for describing an example of tracking a task performed in an information resource by an application.

FIG. 3 is a diagram for describing an example of tracking a task performed in an information resource by an application. For example, in a camera application that performs a function of taking a photo and uploading the photo in a web album, the camera application is executed in operation 310 and a camera photographs an object based on an input of a user in operation 320. At this time, the camera application generates photo data. In operation 330, the generated photo data is stored in a device. A size, resolution, and capacity of the photo data may be adjusted to be suitable for the upload in operation 340 by editing the photo data, and the adjusted photo data is again stored or stored as a new photo data in the device in operation 350 and is uploaded to the web album in operation 360.

Since all tasks performable by an application are performed based on a source code of the application as described above, it is possible to track a task performed on an information resource, such as photo data, by analyzing the source code. The tracking of a task is not limited to the above example, and any type of task performable on an information resource of an application may be tracked. Via such tracking, it is possible to determine how data, such as personal information or sensitive data, flows into another portion of a program.

Referring back to FIG. 2, the information leak determiner 230 determines whether an information resource is externally leaked based on tracking of a task. In FIG. 3, since the photo may be finally uploaded to the web album, the information leak determiner 230 may determine that the camera application may leak the photo data outside the device. If the web album requires login, the camera application may transmit an identification (ID) and a password along with the photo data, and in this case, the source code may be analyzed such that account information is transmitted with the photo data to the web album. The information leak determiner 230 searches for a point where an information resource is leakable to outside the device from a tracking result of the application analyzer 220.

Such a determination of an information resource leak may be performed on one or more information resources existing in a device in a platform. Since the determination is performed based on analyzing the source code, the determination is generally performed on an information resource accessible by the application. However, the determination may not be on an information resource that is not accessible by the application based on permission information requested by additional information included in the application. For example, the source code of the camera application includes a code for performing a function of uploading a photo to a web album, but additional information included in the camera application may not include a request for internet or network access authority. Based only on analysis of the source code, an information resource may be leaked outside a device, but since there is no authority, a leak does not actually occur in this case, and thus it is not desirable to determine that the information resource (i.e., the photo) may be leaked. Accordingly, an access authority to an information resource included in additional information obtained by the application obtainer 210 may be used to determine a leak. Such an operation may be performed as the application analyzer 220 tracks a task of only an information resource having access authority by referring to additional information, or as the application analyzer 220 tracks a task based on a source code and the information leak determiner 230 refers to additional information and a result of the tracking.

Also, it is possible to determine a leak only on an information resource predetermined according to a predetermined criterion. For example, data that is not sensitive to a leak, such as data of a device, may not be determined for a leak. Information resources may be separately classified according to policies of a communication or manufacturing company to determine a leak. An input of adding or deleting a type of information resource to be determined for a leak may be received through a user input receiver (not shown), and an information resource leakable by an application may be determined based on the result.

Also, the information leak determiner 230 may display a result of determination or transmit the result to an application providing server or an application developer device.

Figure 4:
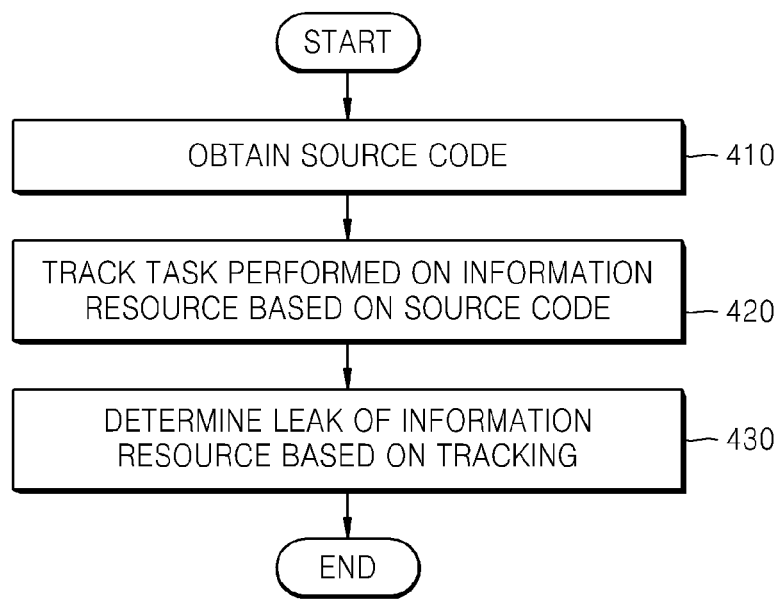
FIG. 4 is a flowchart illustrating a method of determining whether an information resource is leaked to outside a device, according to an embodiment of the present disclosure.

FIG. 4 is a flowchart illustrating a method of determining whether an information resource is leaked to outside a device, according to an embodiment of the present disclosure. Details overlapping with the above description will not be repeated here. Referring to FIG. 4, a source code of an application is obtained from the application in operation 410. Here, additional information including access authority information about an information resource accessible by the application may be additionally obtained. In operation 420, a detection target information resource is determined by analyzing the source code, and a task performable by executing the application with respect to the determined detection target information resource is tracked. In operation 430, it is determined whether a result of tracking includes a task that leaks an information resource to outside a device. An information resource to be determined may be set, added, or deleted according to the above description.

According to the embodiment of the present disclosure described above, a leak of an information resource is accurately determined without having to execute an application by using a static analysis method, unlike a dynamic analysis method. Also, a type of information resource to be detected for a leak is easily added or excluded. Also, when the method is used by a server providing an application, or a smart device, a leak and type of an information resource including personal information and sensitive data are accurately determined, and installation and execution of the application may be thoroughly blocked.

Figure 5:
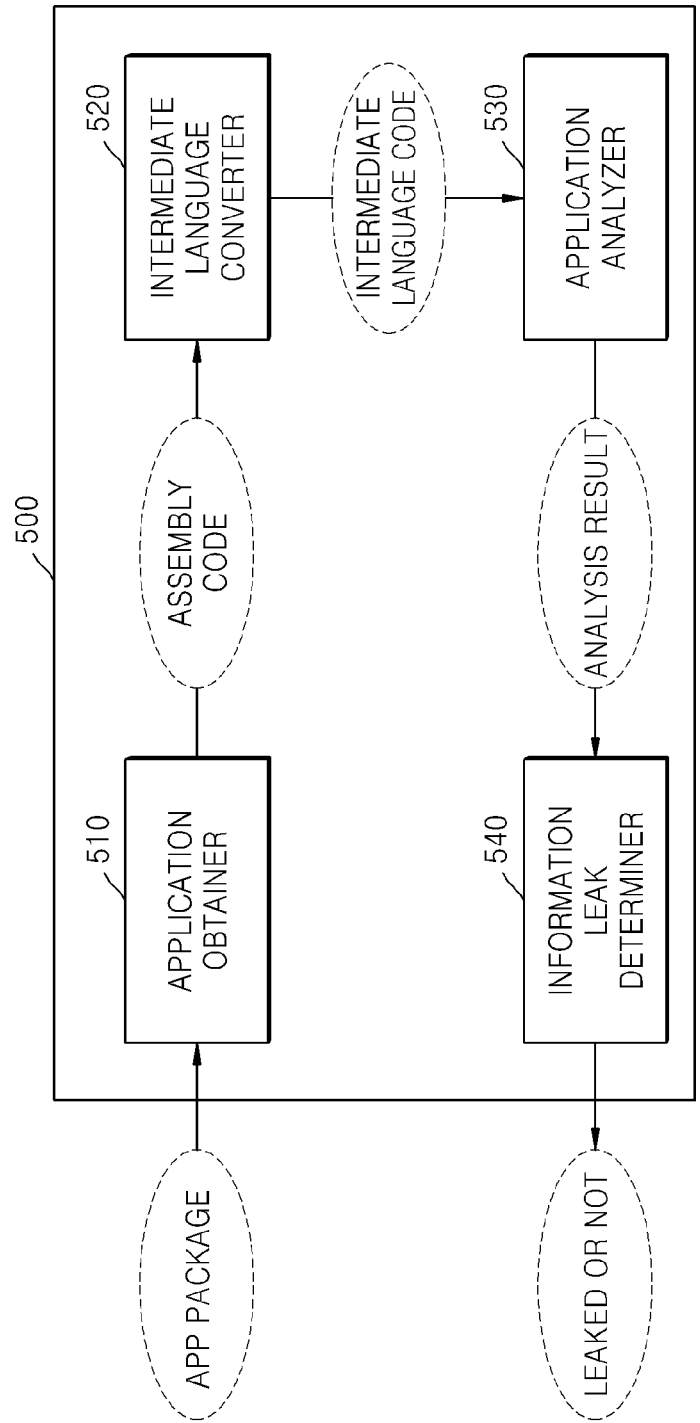
FIG. 5 is a diagram of an apparatus to detect a leak of an information resource, according to another embodiment of the present disclosure.

FIG. 5 is a diagram of an apparatus 500 to detect a leak of an information resource, according to another embodiment of the present disclosure. The apparatus 500 according to the current embodiment includes an application obtainer 510, an intermediate language converter 520, an application analyzer 530, and an information leak determiner 540. The application obtainer 510, the application analyzer 530, and the information leak determiner 540 respectively perform the same or similar functions as the application obtainer 210, the application analyzer 220, and the information leak determiner 230 of FIG. 2. Overlapping details thereof will not be repeated here.

The intermediate language converter 520 translates a program source of an application to an intermediate language source for easier analysis. An application is generally prepared in machine language or a language closely related to machine language. Although different according to a machine, such machine language generally includes various types of instructions, wherein the instructions include similar instructions that have a same core operation but have various forms for optimization. In order to analyze the application, it is efficient to group the instructions according to core functions and define a language for simplifying a structure of a source code.

The number of instructions of machine language of a Dalvik virtual machine in which an application is executed in an Android platform is about 220. A machine language, machine code, or assembly language means a system of impartible instructions executed directly by a computer's central processing unit (CPU). Each instruction performs a very specific task, typically either an operation on a unit of data (in a register or in memory, e.g. add or move), or a jump operation (determining which instruction executes next, often conditional on the results of a previous instruction). Every executable program is made up of a series of these atomic instructions. The machine language of the Dalvik virtual machine includes similar instructions to each other. For example, instructions related to "move" includes 13 similar instructions, instructions related to "return" includes 4 similar instructions, and instructions related to "if" includes 12 similar instructions, which are described in detail below with reference to FIG. 6. In the current embodiment, an intermediate language including 12 instructions capable of including all instructions used in the machine language of Dalvik is defined. Instructions included in an intermediate language may be freely set by a developer, and are not limited to those described in the current embodiment. Furthermore, another type of virtual machine may define an intermediate language by using the same principle and use the intermediate language to analyze a source code.

FIG. 6 is a diagram for describing an example of machine language-intermediate language conversion according to an embodiment of the present disclosure. OPcode denotes an operation code, and assigns an instruction that is a part of a machine language and is to be performed. Each OPcode has a corresponding OPcode name. For example, OPcode "0" corresponds to an OPcode name "nop" and OPcode "0E" corresponds to an OPcode name return-void.

Referring to FIG. 6, since OPcode "1~0D" and OPcode "12~1C" are instructions including a common function related to "move", OPcode "1~0D" and OPcode "12~1C" may be defined as "move" in an intermediate language. As such, machine language instructions corresponding to move*, const*, unop*, and binop* may all be defined as an intermediate language "move". In the same manner, other instructions of the machine language may be abbreviated while maintaining the original meaning. Here, a machine language instruction having a complex function may be expressed using a combination of intermediate language instructions. For example, "return v" denotes "move $r_y, r_v$; return", which may be expressed using a combination of intermediate language instructions "move" and "return".

An intermediate language covering all instructions of a machine language of a Dalvik virtual machine may include 12 instruction sets. The instruction sets may be classified into a data handling instruction group and a flow control instruction group according to properties of instructions. The data handling instruction group may include intermediate language instructions of move, istype, new, get, and put, and the flow control instruction group may include intermediate language instructions of call-direct, call-virtual, return, throw, jmpnz, switch, and skip.

Referring back to FIG. 5, the intermediate language converter 520 converts the source code obtained from the application obtainer 510 to an intermediate language code by using the intermediate language described above. The application analyzer 530 analyzes the intermediate language code. Since an initial application source code has enormous quantity and a plurality of instructions and functions, a long time may be consumed to analyze the initial application source code if a structure of an application is complex. However, by using an intermediate language code, similar or overlapping instructions included in the initial application source code may not be analyzed, and thus a flow of information resources may be determined by analyzing the intermediate language code.

Figure 7:
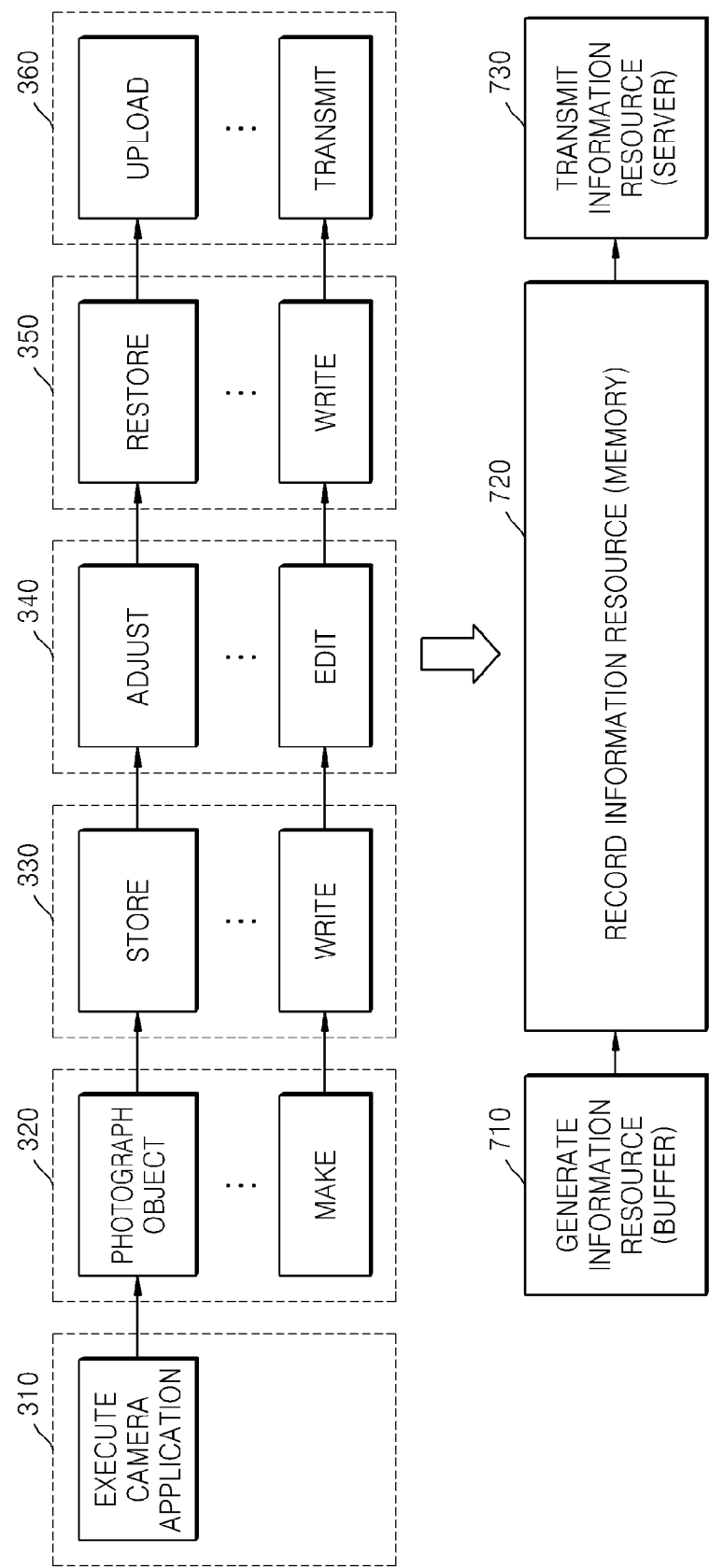
FIG. 7 is a conceptual diagram of tracking a task performed in an information resource by using an intermediate language.

FIG. 7 is a conceptual diagram of tracking a task performed in an information resource by using an intermediate language. FIG. 7 is described by using the description of FIG. 3. Referring to FIG. 7, according to an intermediate language code, a task of photographing an object by executing a camera application may be analyzed as a task 710 of generating an information resource in a buffer, a task of storing, editing, and re-storing the photo may be analyzed as a task 720 of recording the information resource in a memory or storage medium, and a task of uploading the photo to a web album may be analyzed as a task 730 of transmitting the information resource to a server.

Figure 8:
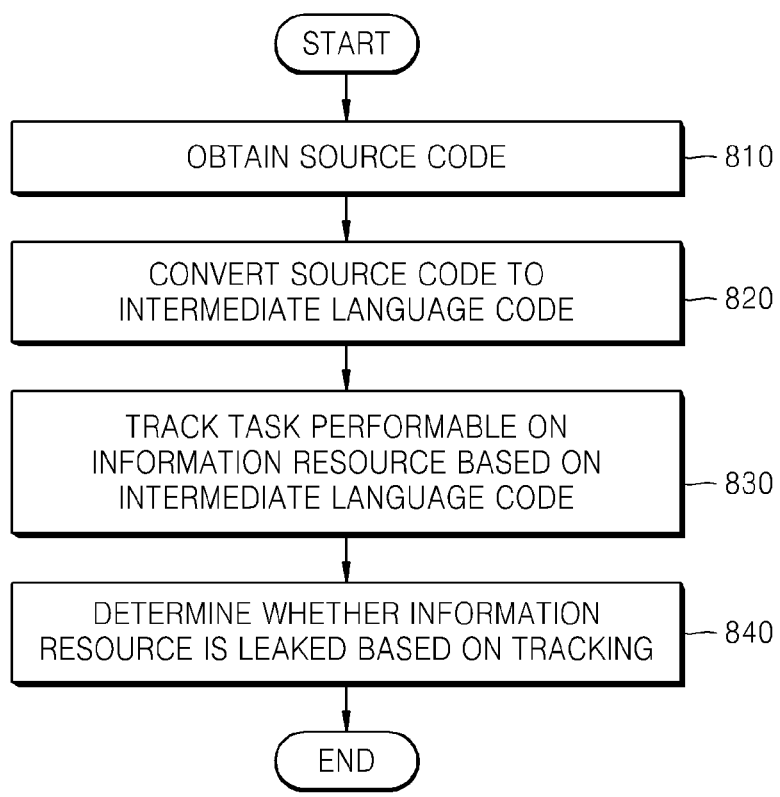
FIG. 8 is a flowchart illustrating a method of determining whether an information resource is leaked to outside a device, according to another embodiment of the present disclosure.

FIG. 8 is a flowchart illustrating a method of determining whether an information resource is leaked to outside a device, according to another embodiment of the present disclosure. Details overlapping the above descriptions will not be repeated here. Referring to FIG. 8, a source code of an application is obtained from the application in operation 810. Here, additional information including access authority information about an information resource accessible by the application may be additionally obtained. In operation 820, the obtained source code is converted into an intermediate language code by using an intermediate language. The intermediate language includes an intermediate language instruction defined by grouping instructions included in the obtained source code based on a common function. In operation 830, a task that is performable on at least one information resource is tracked based on analyzing of the intermediate language code. In operation 840, it is determined whether a task that leaks the information resource to outside of a device exists in a result of the tracking. An information resource to be determined may be set, added, or deleted.

According to the current embodiment, since a leak of sensitive data by an application is determined by using the intermediate language code, an analyzing speed may be increased and system resource consumption may be reduced.

According to an embodiment of the present disclosure, a leak of an information resource may be accurately determined without having to execute an application by using a static analysis method, unlike a dynamic analysis method. Also, a type of information resource to be detected for determining a leak may be easily added or excluded. Also, in a server providing an application, or a smart device, a leak and type of an information resource including personal information and sensitive data may be accurately determined, and installation and execution of the application may be fundamentally blocked.

According to another embodiment of the present disclosure, since a leak of sensitive data by an application is determined by using source code converted to an intermediate language code, an analyzing speed may be increased and system resource consumption may be reduced.

It would be interpreted by one of ordinary skill in the art that the block diagrams described in the embodiments of the present disclosure conceptually indicate a circuit for realizing principles of the present disclosure. Similarly, it would be apparent to one of ordinary skill in the art that a predetermined flowchart, a flow graph, a state transition diagram, and pseudo code may be substantially expressed in a computer-readable recording medium and indicate various processes executed by a computer or a processor, even if the computer or processor is not explicitly shown. Accordingly, the embodiments of the present disclosure may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, Blu-rays or DVDs), etc.

The functions of various components shown in diagrams may be provided by using not only hardware for executing software by being related to suitable software, but also by exclusively using hardware. When the functions are provided by a processor, the functions may be provided by a single exclusive processor, a single common processor, or a plurality of individual processor, wherein some processors are shared. Also, the terms 'processor' and 'controller' shall not be interpreted to exclusively indicate hardware for executing software, and may unlimitedly and implicitly include digital signal processor (DSP) hardware, read-only memory (ROM) for storing software, random access memory (RAM), and non-volatile storage device.

In the claims, an component expressed as a unit to perform a certain function may include a predetermined method of performing the certain function, and may include a combination of circuit components to perform the certain function, or software in a predetermined form including firmware or microcode combined with a suitable circuit for executing software to perform the certain function.

In the present specification, 'an embodiment' and other modified expressions mean that a certain feature, structure, or characteristic is included in at least one embodiment of the present disclosure. Accordingly, the expression "an embodiment" and other modified examples in the present specification may not denote the same embodiment.

In the present specification, the expression "at least one of A and B" is used to include a selection of only A, only B, or both A and B. Furthermore, the expression "at least one of A through C" may be used to include a section of only A, only B, only C, only A and B, only B and C, or all of A through C.

One of ordinary skill in the art would be able to clearly interpret a similar expression with more components.

The embodiments of the present disclosure have been described above.

While this disclosure has been particularly shown and described with reference to preferred embodiments thereof, it will be understood by those of ordinary skill in the art that various changes in form and details may be made therein without departing from the spirit and scope of the disclosure as defined by the appended claims. The preferred embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. A method of detecting a leak of an information resource of a device, the method comprising:
    obtaining source code from an application;
    determining, by a processor, whether at least one information resource from among information resources of the device is a candidate information resource that is determined for transmission availability to outside of the device;
    tracking a task performed with respect to the candidate information resource based on the source code; and
    determining whether the at least one information resource is transmittable to outside of the device, based on the tracking.

2. The method of claim 1, wherein the determining comprises determining that at least one information resource from among information resources determined to be accessible by the application is the candidate information resource, based on the source code.

3. The method of claim 1, further comprising obtaining additional information including access authority information about information resources accessible by the application from the application,
    wherein the determining comprises determining that at least one information resource from among the information resources accessible by the application is the candidate information resource, based on the additional information.

4. The method of claim 1, wherein the candidate information resource is determined based on a predetermined criterion.

5. The method of claim 4, wherein one or more information resources are addable to or excludable from the candidate information resource based on an input of a user.

6. The method of claim 1, further comprising converting the source code to an intermediate language code by using an intermediate language,
    wherein the tracking comprises tracking the task performed with respect to the candidate information resource based on the intermediate language code.

7. The method of claim 6, wherein the converting comprises grouping one or more instructions included in the source code according to a predetermined criterion, and converting the grouped one or more instructions by matching the grouped one or more instructions with one intermediate language instruction.

8. The method of claim 6, wherein the converting comprises converting one instruction included in the source code to a combination of one or more intermediate languages instructions according to a predetermined criterion.

9. An apparatus to detect a leak of an information resource of a device, the apparatus comprising:
    a processor, comprising:
    an application obtainer to obtain source code from an application;
    an application analyzer to determine whether at least one information resource from among information resources of the device is a candidate information resource that is determined for transmission availability to outside of the device, and tracking a task performed with respect to the candidate information resource based on the source code; and
    an information leak determiner to determine whether the at least one information resource is transmittable to outside the device, based on the tracking.

10. The apparatus of claim 9, wherein the candidate information resource comprises at least one information resource from among information resources determined to be accessible by the application based on the source code.

11. The apparatus of claim 9, wherein the application obtainer further obtains additional information comprising access authority information about information resources accessible by the application, and
    the candidate information resource comprises at least one information resource from among the information resources accessible by the application based on the additional information.

12. The apparatus of claim 9, wherein the candidate information resource is determined based on a predetermined criterion.

13. The apparatus of claim 12, wherein one or more information resources are addable to or excludable from the candidate information resource based on an input of a user.

14. The apparatus of claim 9, further comprising an intermediate language converter to convert the source code to an intermediate language code by using an intermediate language,
    wherein the application analyzer tracks a task performed with respect to the candidate information resource based on the intermediate language code.

15. The apparatus of claim 14, wherein the intermediate language converter groups one or more instructions included in the source code according to a predetermined criterion, and converts the grouped one or more instructions by matching the grouped one or more instructions with one intermediate language instruction.

16. The apparatus of claim 14, wherein the intermediate language converter converts one instruction included in the source code to a combination of one or more intermediate languages instructions according to a predetermined criterion.

17. A non-transitory computer-readable recording medium having recorded thereon a program to execute the method of claim 1.

* * * * *